US006920564B2

(12) United States Patent
Decuir

(10) Patent No.: US 6,920,564 B2
(45) Date of Patent: Jul. 19, 2005

(54) METHODS, SYSTEMS, COMPUTER PROGRAM PRODUCTS, AND DATA STRUCTURES FOR LIMITING THE DISSEMINATION OF ELECTRONIC MAIL

(75) Inventor: Joseph Charles Decuir, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 09/802,181

(22) Filed: Mar. 8, 2001

(65) Prior Publication Data

US 2002/0129275 A1 Sep. 12, 2002

(51) Int. Cl.[7] .............................. H04L 9/32; H04L 9/00
(52) U.S. Cl. ...................... 713/189; 713/165; 713/166; 713/167
(58) Field of Search ................................ 713/160–162, 713/165–168, 170, 189, 200–202; 709/200–201

(56) References Cited

U.S. PATENT DOCUMENTS 6,427,140 B1 * 7/2002 Ginter et al. ................. 705/80
6,704,772 B1 * 3/2004 Ahmed et al. ............... 709/207
6,721,784 B1 * 4/2004 Leonard et al. ............. 709/206

* cited by examiner

Primary Examiner—Hosuk Song
(74) Attorney, Agent, or Firm—Workman Nydegger

(57) ABSTRACT

An e-mail sender client accesses an e-mail message and sets an associated "eyes-only" indicator indicating that functions that limit the opportunity to disseminate e-mail messages are to be applied to the e-mail message. The e-mail sender client then encrypts the e-mail message, and dispatches the e-mail message to the e-mail reader client in encrypted form. Upon receipt, the e-mail server determines that the e-mail message has the eyes-only indicator set. In response, the e-mail server verifies that the e-mail reader client is capable of implementing the "eyes-only" functions and authenticates the user of the e-mail reader client as being an intended recipient. The e-mail server then transmits the encrypted e-mail message to the e-mail reader client. Upon receipt, the e-mail reader client determines that the e-mail message has an associated "eyes-only" indicator set, and then applies the appropriate "eyes-only" functions to the e-mail message.

44 Claims, 6 Drawing Sheets

METHODS, SYSTEMS, COMPUTER PROGRAM PRODUCTS, AND DATA STRUCTURES FOR LIMITING THE DISSEMINATION OF ELECTRONIC MAIL

BACKGROUND OF THE INVENTION

1. The Field of the Invention

The present invention relates to the field of electronic mail communications. In particular, the present invention relates to the limiting of what an electronic mail recipient may do with an electronic mail message so as to limit the ability to disseminate the electronic mail.

2. Background and Related Art

Electronic mail or "e-mail" has revolutionized the way people communicate. E-mail involves the transmission of messages over networks. The wide proliferation of the Internet allows individuals to communicate via e-mail over vast areas of the globe in a matter of hours, minutes or even seconds depending on the network traffic and server capabilities corresponding to the route the e-mail traverses. Thus, e-mail is characteristically much faster than traditional postal mail. E-mail also does not demand the immediate attention of the recipient as might a telephone call and is considered a polite option where immediate attention is not required. E-mail also allows an electronic record of a chain or "thread" of conversations to be easily maintained thus allowing the reader to review the context of a conversation with relative ease E-mails also may be event driven, in which case an event triggers the transmission of e-mail rather than having a human sender order each e-mail be sent. For these and many other reasons, e-mail has become a major means for communication in the modem world.

Often, even sensitive information is communicated via e-mail. Conventional security methods designed to protect sensitive information include transmitting e-mail in encrypted form, and matching clients and authenticating users before decrypting and delivering the e-mail to an authorized recipient. Unfortunately, however, conventional e-mail technology still allows an authorized recipient to manipulate the e-mail so that unauthorized individuals may view the sensitive information. For example, the e-mail might be copied and pasted into another application, forwarded to unauthorized readers, or printed and distributed to unauthorized readers. Although there are methods for detecting when someone has forwarded a sensitive e-mail, these methods only detect those that have leaked the information, rather than preventing the undesired dissemination of the information in the first place. Therefore, what are desired are ways of preventing the undesired dissemination of e-mail as when the e-mail contains sensitive information that might be harmful if disseminated to unintended readers.

SUMMARY OF THE INVENTION

In accordance with the present invention, an e-mail network operates to limit the opportunity to disseminate sensitive e-mail messages to unintended recipients. The e-mail network includes an e-mail sender client that sends an e-mail message to an e-mail reader client. The e-mail message is routed through an e-mail server that is associated with the e-mail reader client.

In operation, the e-mail sender client accesses an e-mail message and sets an associated indicator (hereinafter called an "eyes-only" indicator) indicating that one or more "eyes-only" functions that limit the opportunity to disseminate e-mail messages are to be applied to the e-mail message. For example, if the e-mail content is sensitive, then the drafter may want to limit the intended reader's ability to print, copy, save, forward, or print screen the e-mail message. The drafter may also want to limit reply or "reply all" functionality. In addition, the drafter may want to limit the amount of time the e-mail message may be viewed on a monitor. The e-mail sender client then encrypts the e-mail message, and dispatches the e-mail message to the e-mail reader client in encrypted form.

After the e-mail server receives and stores the e-mail message in encrypted form, the e-mail server determines that the e-mail message has the eyes-only indicator set. In response, the e-mail server verifies that the e-mail reader client is capable of implementing the one or more "eyes-only" functions. In addition, the e-mail server authenticates the user of the e-mail reader client as being an intended recipient of the e-mail message. If the e-mail reader client is capable of enforcing the "eyes-only" functions, and if the user is properly authenticated, the e-mail server transmits the e-mail message to the e-mail reader client in encrypted form.

The e-mail reader client then receives and stores the e-mail message in encrypted form, and then determines that the e-mail message has an associated "eyes-only" indicator set. In response, the appropriate "eyes-only" functions are applied to the e-mail message. The "eyes-only" functions may be set by default, or may be specified in the "eyes-only" indicator itself, or both.

Thus, in order to disseminate a sensitive e-mail, one would have to either choose a dissemination option that is not restricted by the "eyes-only" functions. Ideally, the "eyes-only" functions are exhaustive such that there are few, if any, dissemination options available for unauthorized dissemination. Alternatively, one would have to access the client-side code that enforces the "eyes-only" functionality, and then modify the code to disable the "eyes only" functions. This latter option is very difficult and would represent a significant disincentive to the unauthorized dissemination of e-mail.

The principles of the present invention thus significantly limit the tools that may be used by an intended reader to disseminate an e-mail message when such dissemination is undesired by the sender of the e-mail message Thus, e-mail security is significantly improved.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
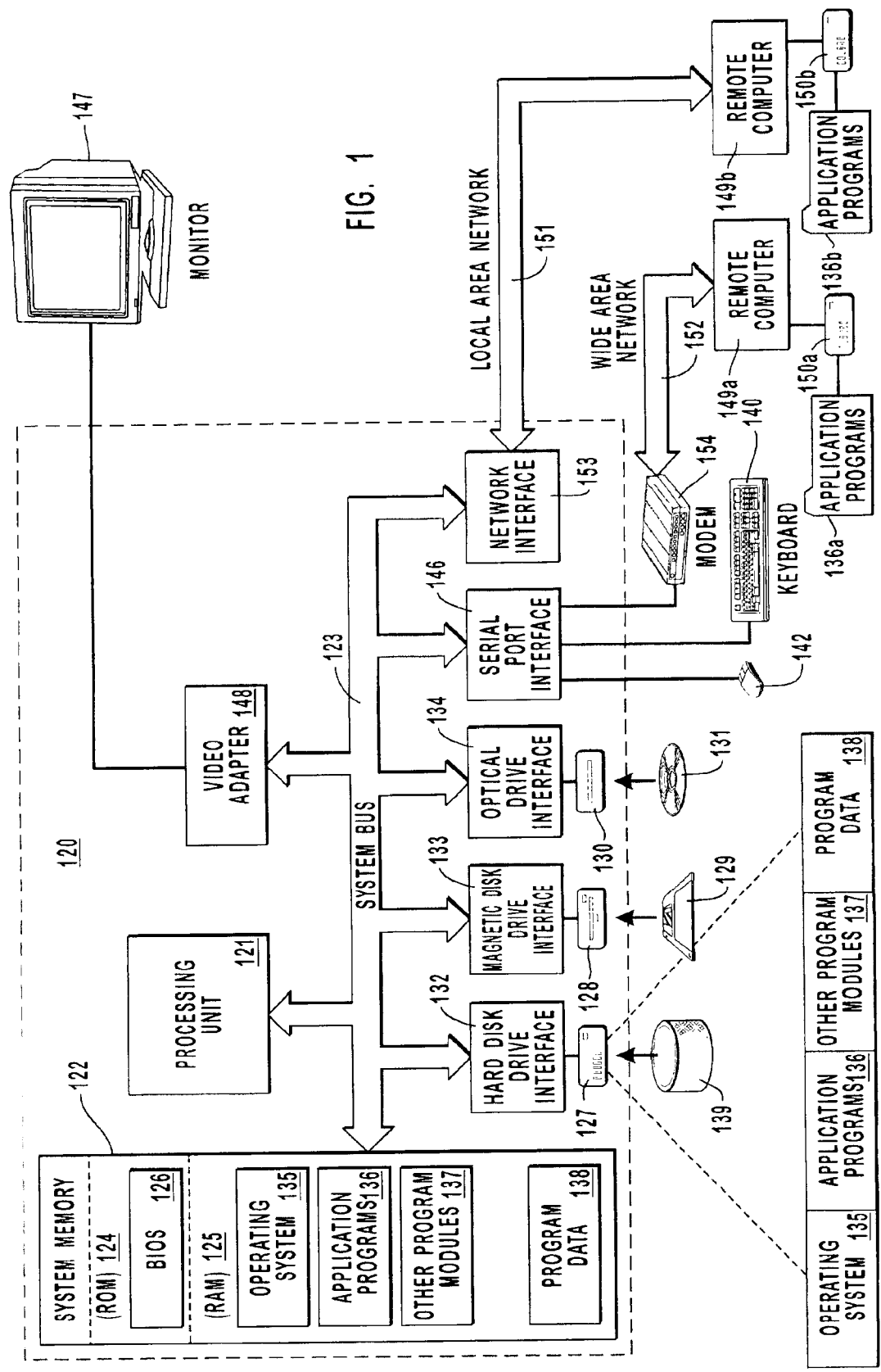
FIG. 1 illustrates an exemplary system that provides a suitable operating environment for the present invention.

The present invention extends to methods, systems, computer program products and data structures for significantly reducing the risk of undesired dissemination of electronic mail ("e-mail") that might occur when an authorized reader receives a sensitive e-mail. The sender client computer system ("sender client") establishes an encryption/decryption key with the reader client computer system ("reader client"). The sender client composes an e-mail and invokes a special "eyes-only" attribute associated with the e-mail. The sender client then transmits the e-mail to the reader client in encrypted form.

The target e-mail server detects that the e-mail message has the eyes-only attribute set. In response, the target server detects whether or not the reader client supports the eyes-only attribute. If the reader client supports the eyes-only attribute, the target server delivers the eyes-only e-mail to the reader client. In supporting the eyes-only attribute, the reader client requires user authentication before displaying the e-mail. Even if the user is properly authenticated, however, the reader client performs certain functions that limit the opportunity of the associated user to disseminate the e-mail For example, the reader client may disable certain functions such as printing, copying, saving, forwarding, and printing a screen view. Certain "reply" or "reply all" functions may also be limited. In addition, the reader client may enable other functions that discourage disseminating information such as a "time out" function. For example, the e-mail may be displayed for only a brief period long enough for a user to read the information, but not long enough for unauthorized friends to enter the office to also read the message. While dissemination may still be possible, the present invention significantly reduces the opportunity to do so.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media.

The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
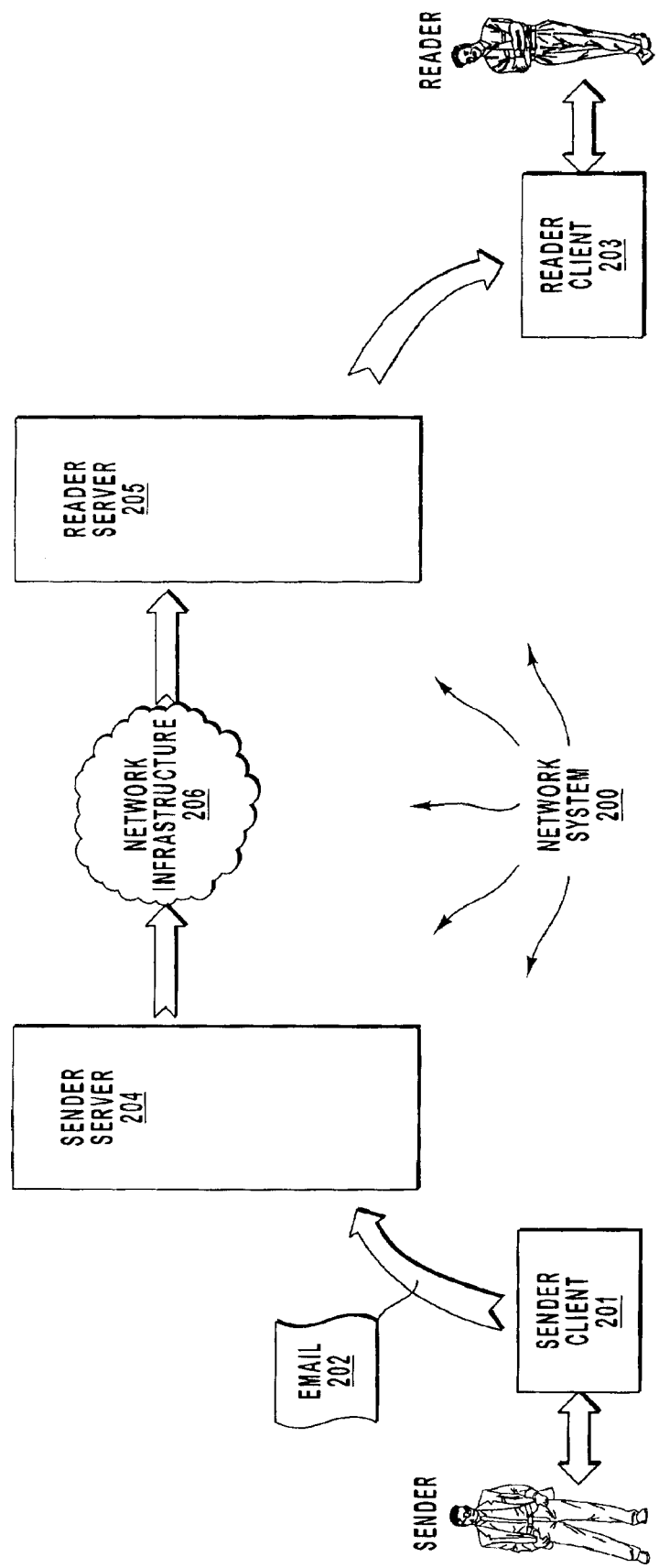
FIG. 2 illustrates a network system that may be used to communicate e-mail messages.

FIG. 2 illustrates a network system 200 in which the present invention may operate. The network system 200 includes a sender client 201 that is associated with a sender of an e-mail 202, and a reader client 203 that is associated a reader of the e-mail. In one embodiment, the sender client 201 and the reader client 203 are configured as described above for computer 120, although this certainly is not required. The sender client 201 may be any device now capable (or that will be capable) of sending e-mail. The reader client 203 may be any device now capable (or that will be capable) of receiving e-mail. Many types of devices are capable of sending and receiving e-mail including desktop computers, lap-top computers, Personal Digital Assistants (PDAs), wireless telephones, pagers, and so forth. It is currently anticipated that may other types of devices will be capable of sending and receiving e-mail in the future. Currently existing devices will, however, require modification (in either software, hardware, or a combination thereof) in order to accomplish the principles of the present invention as will be apparent from this description.

The network system 200 also includes an e-mail server (i.e., "sender server") 204 that is associated with the sender client 201, and an e-mail server (i.e., "reader server") 205 that is associated with the reader client 203. These servers may also be configured as described above for computer 120 although this is also not necessary. For example, the sender server 204 and reader server 205 may operate without the need to interface with a user and thus may not include keyboard 140, pointing device 142, or monitor 147. Essentially, the servers may be any device capable of performing the corresponding server operations claimed in the following claims.

The sender server 204 is network connectable over network infrastructure 206 to the reader server 205. In this description and in the claims, "network connectable" mean having the ability to be network connected. Two devices being "network connected" means that one device is able to communicate with the other device either directly or through one or more networks. Thus, "network connected" includes all forms of electronic unidirectional or bi-directional communication whether or not such communication is connection oriented. Alternatively, if the sender client 201 and the reader client 203 share the same e-mail server, the sender server 204 and the reader server 205 are the same.

Figure 3:
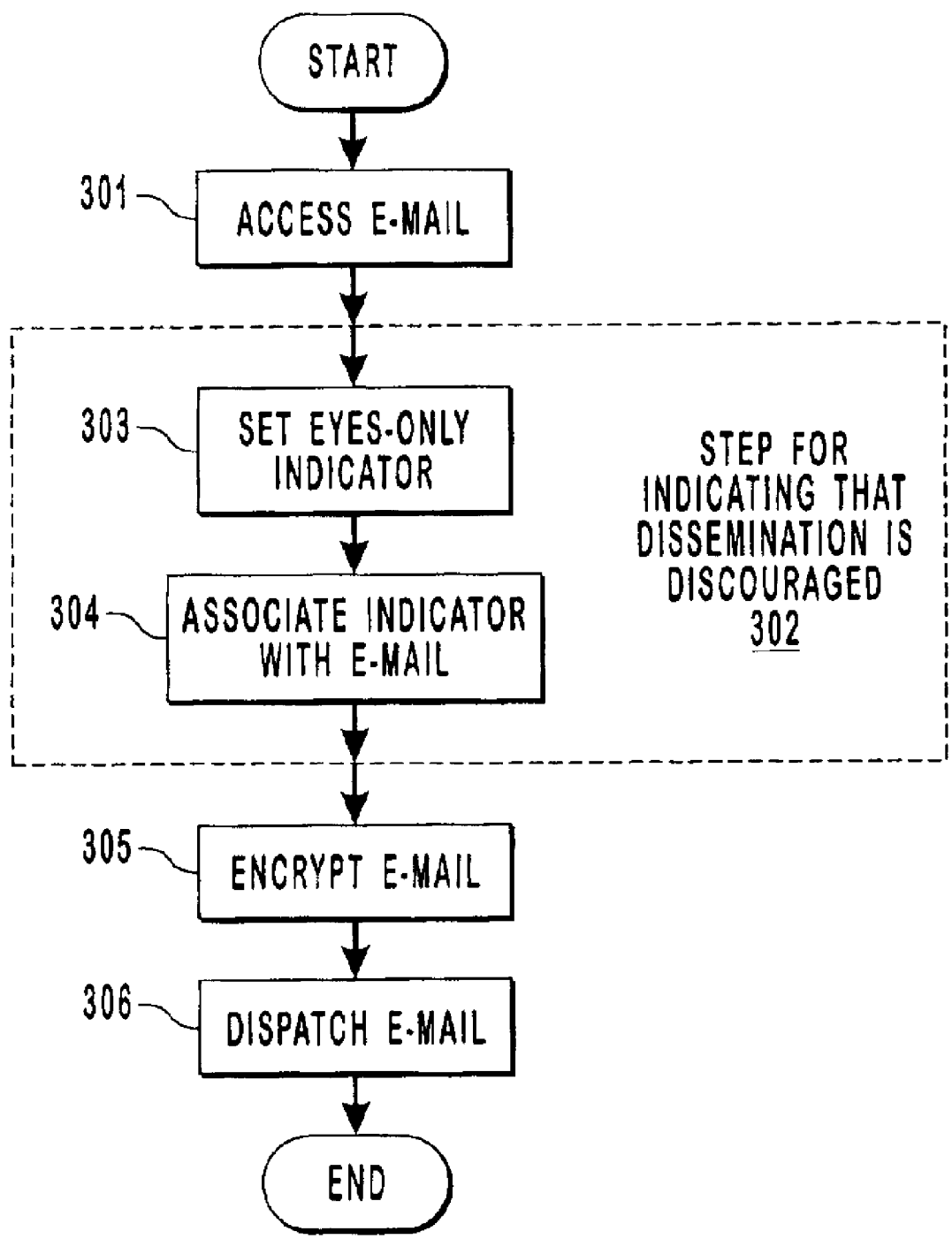
FIG. 3 illustrates a flowchart of a method performed by the e-mail sender client of FIG. 2 to facilitate eyes-only capability in accordance with the present invention.
Figure 4:
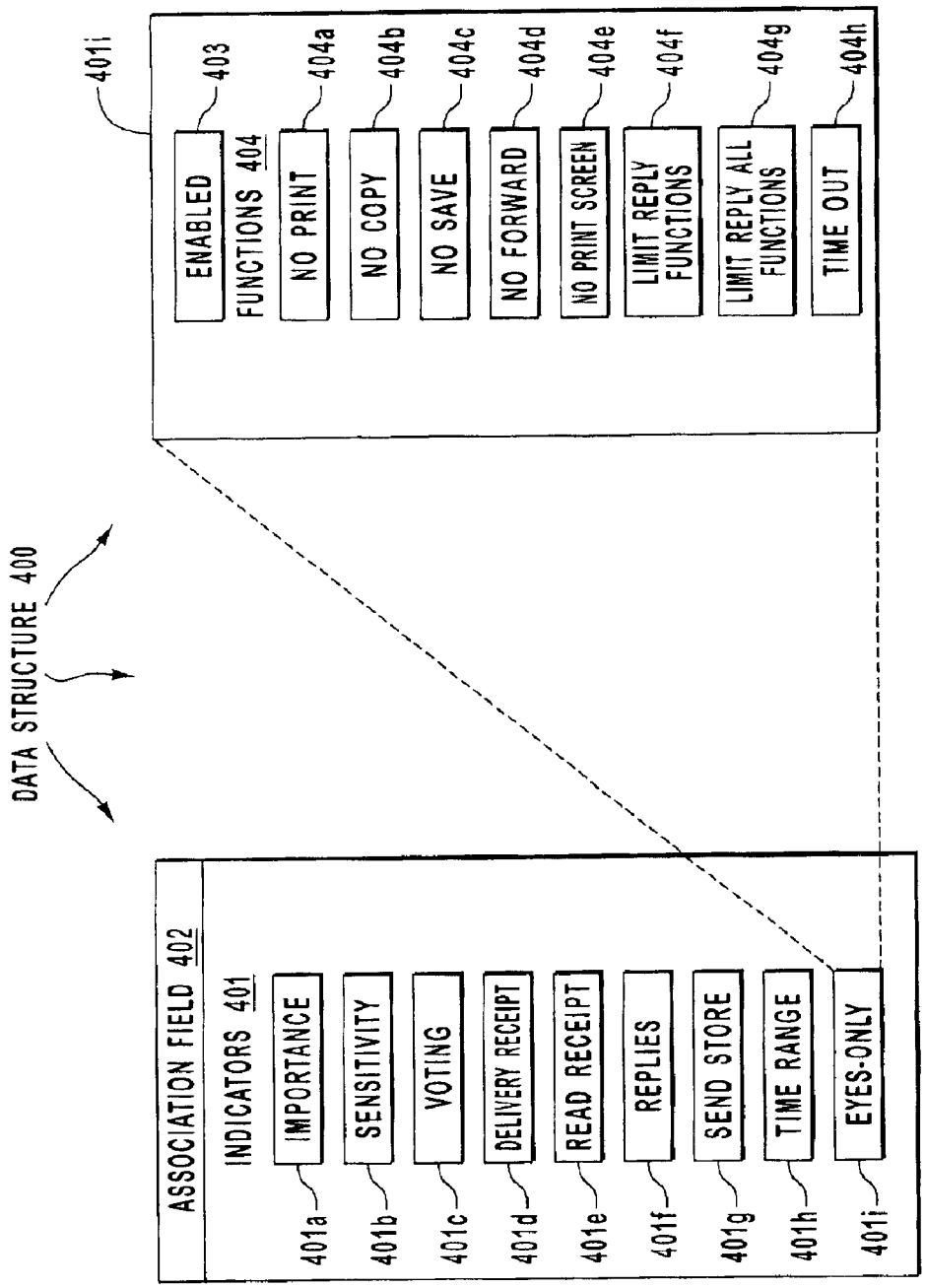
FIG. 4 illustrates a data structure that facilitates eyes-only capability in accordance with the present invention.
Figure 5:
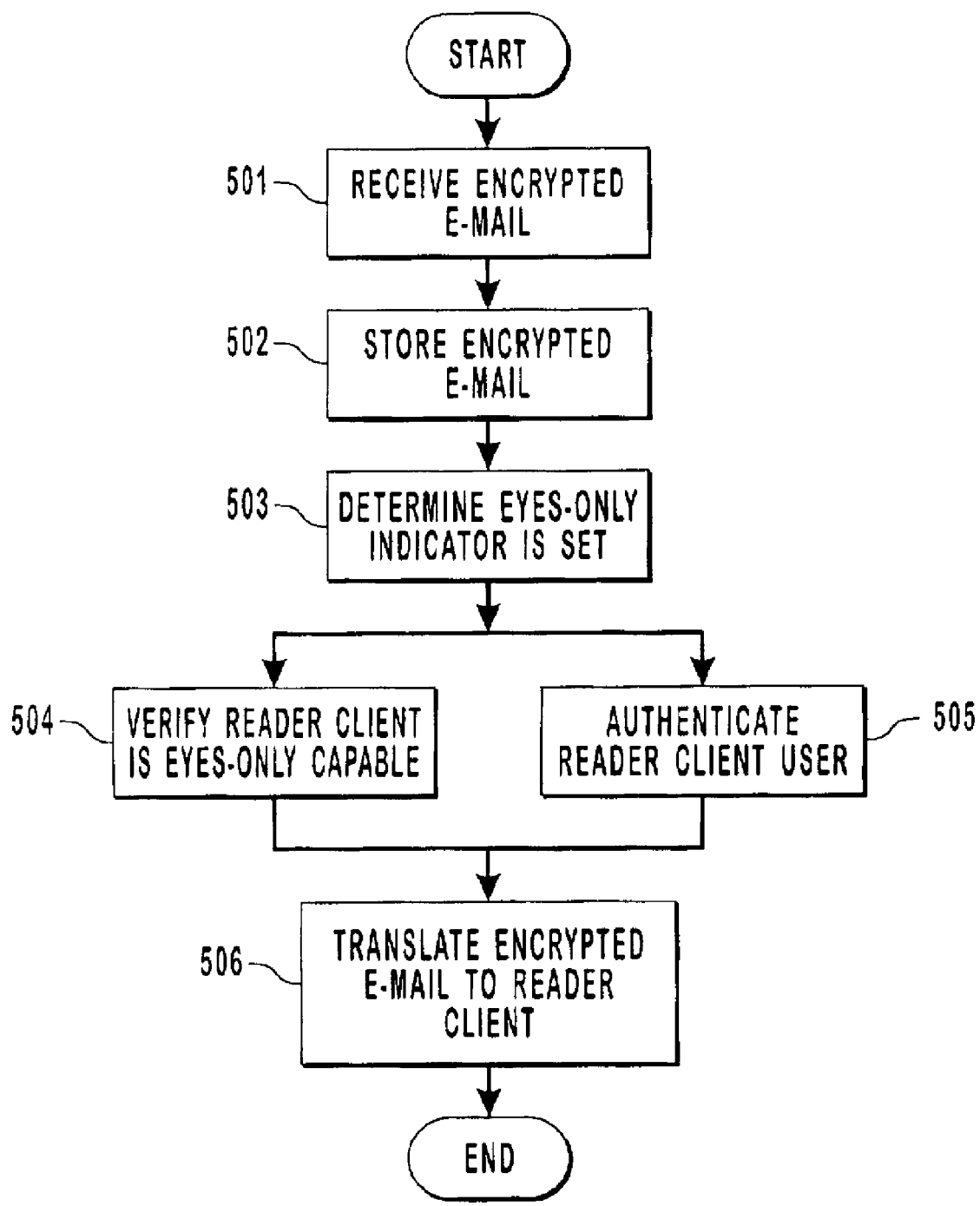
FIG. 5 illustrates a flowchart of a method performed by an e-mail server such as the reader server of FIG. 2 to facilitate eyes-only capability in accordance with the present invention.

FIGS. 3–5 illustrates flowcharts of a method for discouraging the undesired dissemination of e-mail in accordance with the present invention. In this description and in the claims, "dissemination of e-mail" means any acts that allows someone, other than the intended reader(s) of the e-mail, to access some or all of the information contained within the e-mail.

FIG. 3 illustrates those acts performed by the sender client 201. First, the sender client 201 accesses an e-mail message (act 301). For example, the sender client may allow the sender user to generate an e-mail message. The sender client may also retrieve a pre-generated e-mail message from memory, or automatically generate the e-mail message according to a predetermined set of rules such as the occurrence of an event.

Then, the sender client 201 performs a step for indicating that dissemination of the e-mail message is discouraged (step 302). In the example shown in FIG. 3, this step includes corresponding act 303 and 304. In particular, the sending client sets an indicator indicating a desire to limit one or more functions that allow for dissemination of e-mail messages and/or enable one or more functions that discourage dissemination of e-mail messages (act 303). Since the objective is to limit the access to only intended readers, that indicator will be called herein an "eyes-only" indicator. Thus, in the specification and in the claims, an "eyes-only"

indicator is defined as being an indicator that indicates a desire to limit one or more functions that allow for dissemination of e-mail messages and/or enable one or more functions that discourage dissemination of e-mail messages subsequent to the intended reader receiving the e-mail.

The indicator is then associated with the accessed e-mail message (act 304). Association may occur automatically upon the setting of the indicator. FIG. 4 illustrates a data structure 400 in which a plurality of indicators 401 is associated with the e-mail message 202. The plurality of indicators may include any type of indicator that represents an attribute of the associated e-mail message. Each attribute may include multiple data fields as desired.

As a representative example, the plurality of indicators may include an indicator 401a that represents an importance level (e.g., low, medium or high); an indicator 401b that represents a sensitivity level (e.g., normal, personal, private, or confidential); an indicator 401c of whether to use voting buttons (e.g., approve, reject; or yes, no, maybe) when making a proposal; an indicator 401d of whether a delivery receipt is requested; an indicator 401e of whether a read receipt is requested; and indicator 401f of whether to send replies to a different person than the sender, and if so, who; and indicator 401g of whether and where to store sent messages; and an indicator 401h that represents any time range within which to send the message. Additionally, a unique indicator 401i represents an eyes-only feature that indicates that the opportunity of the intended message recipient to disseminate the message is to be limited.

These indicators 401 may be associated with the e-mail message 202 by means of an association field 402 which may be, for example, a pointer or a some other information useful to relate the indicators 401 with the e-mail message 202. In one example, the association of the indicators 401 with the e-mail message 202 may be intrinsic based on a location. For example, the indicators 401 may be physically contiguous with the e-mail message 202 or may be embedded within the e-mail message 202. The manner in which the eyes-only indicator 401i is associated with the e-mail message 202 is not important to the present invention, so long as the association is transmitted with the e-mail message 202 so that the eyes-only indicator 401i may be interpreted as described herein by other computer systems en route.

The eyes-only indicator 401i may simply have an enable flag 403 that indicates whether or not to enable the eyes-only feature. Optionally, the eyes-only indicator 401i may also include specific functions 404 that the reader client 203 must support in order to receive the e-mail For example, attribute NO PRINT 404a, NO COPY 404b, NO SAVE 404c, NO FORWARD 404d, and NO PRINT SCREEN 404e indicate that the reader client 203 must not be able to print, copy, save, forward, or print screen the e-mail message 202. Specifically, the NO COPY 404b attributes disables the cut and copy editing functions. The attributes LIMIT REPLY FUNCTIONS 404f and LIMIT REPLY ALL FUNCTIONS 404g limit the functionality of the "reply" and the "reply all" buttons, respectively, as described below. In addition, the attribute TIME OUT 404h indicates that the reader client must be able to forcibly disable the display of the e-mail message within a given period. If the reader client does not support any of the functions 404, the reader client does not qualify to receive the e-mail message 202.

Returning back to FIG. 3, once the step for indicating that dissemination is discouraged (step 302) has completed, the sender client 201 encrypts the e-mail message (act 305) and dispatches the e-mail message to the e-mail reader client 203 in encrypted form (act 306). The e-mail message then traverses the network system 200 (see FIG. 2) to the reader server 205.

FIG. 5 illustrate a flowchart of how the reader server 205 processes the e-mail message in accordance with the present invention. After receiving the e-mail message in encrypted form (act 501), the e-mail message is then stored in encrypted form (act 502). This storage may involve any type of memory including system memory or possibly permanent disk storage. The reader server 205 then determines that the e-mail message has an associated eyes-only indicator that is enabled (act 503).

The reader server 205 then verifies that the e-mail reader client 203 is capable of limiting the one or more functions that allow for dissemination of e-mail messages and/or enabling one or more functions that discourage dissemination of e-mail messages (act 504). In other words, the reader server 205 determines whether the e-mail reader client 203 is capable of enforcing the minimum eyes-only functionality. This minimum standard may be set by the functions fields 404 in the eyes-only indicator 401i of the e-mail message. Alternatively, or in addition, there may be set standards as to the minimum requirement to support eyes-only functionality. The e-mail reader client 203 may indicate the eyes-only ability to the reader server 205 during the initial registration process or during any other time. Optionally, the reader server 205 also authenticates the user of the reader client 203 as being the true intended recipient of the e-mail message (act 505). This may be done at any time. Once the eyes-only capability of the reader client is verified (act 504), and the user of the reader client is optionally authenticated (act 505), the encrypted e-mail is transmitted to the reader client (act 506).

Figure 6:
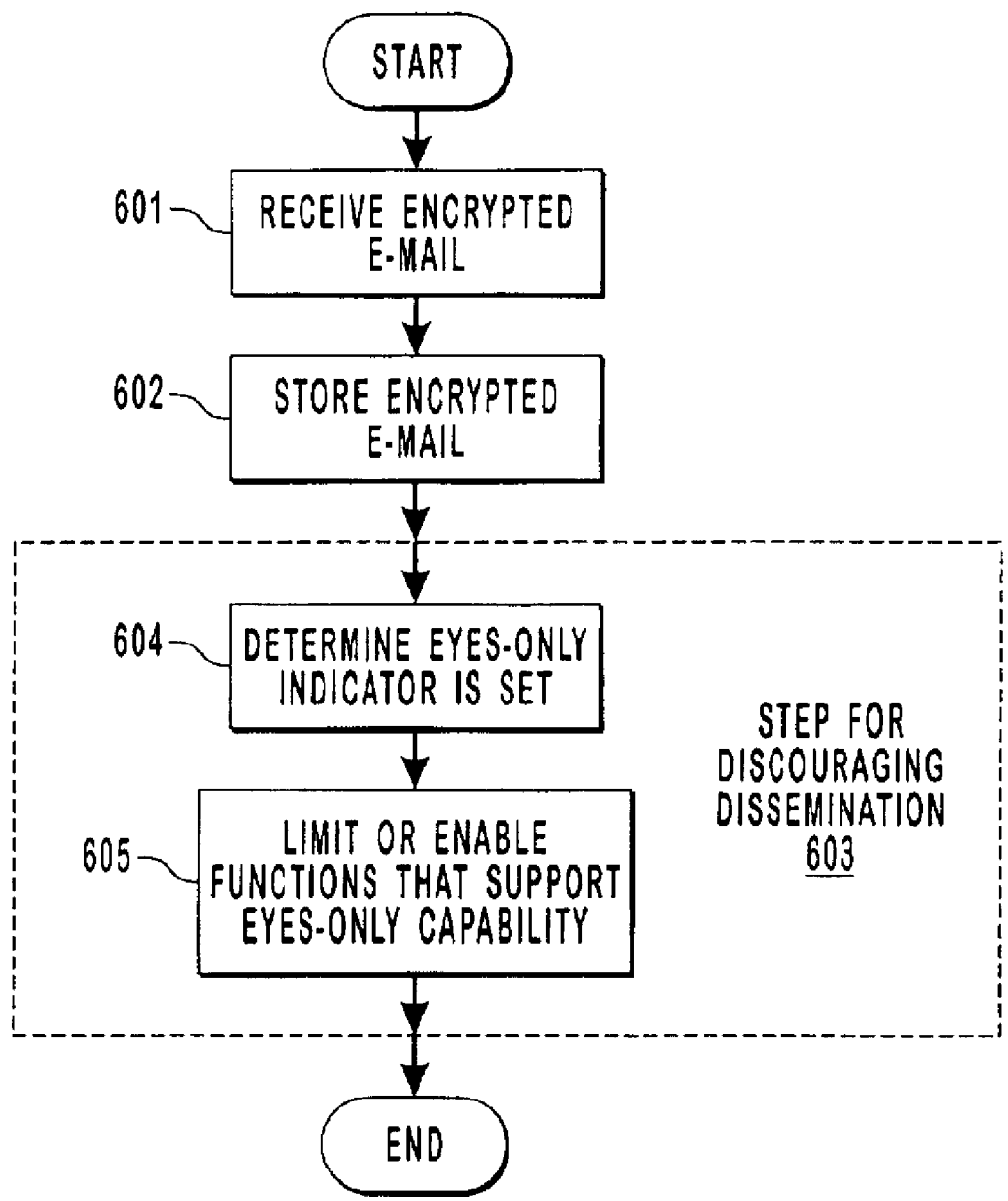
FIG. 6 illustrates a flowchart of a method performed by the e-mail reader client of FIG. 2 to implement the eyes-only capability in accordance with the present invention.

FIG. 6 illustrates a flowchart of how the reader client 203 processes the e-mail message. First, the reader client 203 receives the encrypted e-mail message (act 601) and stores the e-mail message in encrypted form (act 602). The reader client 203 then performs a step discouraging the dissemination of e-mail messages if an intent to discourage is associated with the e-mail message (step 603). In the example of FIG. 6, this step includes corresponding acts 604 and 605.

Specifically, the reader client determines that the e-mail message has an associated indicator that indicates a desire to limit one or more functions that allow for dissemination of e-mail messages and/or enable one or more functions that discourage dissemination of e-mail messages (act 604). The reader client may make this determination by reading the eyes-only indicator for the e-mail message to determine whether the eyes-only functions are to be applied to this e-mail message.

Next, the reader client 203 limits the one or more functions that allow for dissemination of e-mail messages and/or enables one or more functions that discourage dissemination of e-mail messages (act 605). The eyes-only functions to be performed may be determined by default or may be determined by the function indicators 404 in the data structure 400 associated with the e-mail message. For example, the reader client 203 may forbid printing, copying, saving, or forwarding the e-mail message or perhaps disable the print screen key on the keyboard as long as the e-mail message is displayed. In addition, the reader client 203 enforce a time out in which the e-mail message is only displayed for a period long enough for the intended reader to be able to read the e-mail message.

In addition to preventing the forwarding of an e-mail message by, for example, disabling the "forward" button, the reader client 203 may also limit the functionality of the "reply" and "reply all" buttons offered by many e-mail programs. Typically, when a user is displayed an e-mail message, the user may select a reply button in order to send a reply message back to the sender. When the reply button is selected, the original message is included in the reply message and the original sender address is included in a "TO" field. However, conventionally, the user may still change the original sender address in the "TO" field and/or add recipients by specifying the address in the "CC" (Carbon Copy) field or "BCC" (Blind Carbon Copy) field. To prevent a user from disseminating the e-mail, the ability to edit the TO, CC, and BCC fields may be disabled thus preventing the user from using the reply button to reply to anyone but the original sender.

In addition, conventional e-mail programs typically have a "reply all" button which is similar to the "reply" button except that selecting the reply all button also automatically fills the CC field of the reply message with the addresses that were original listed in the CC field of the original message. To prevent dissemination using the reply all button, editing of the TO, CC, and BCC fields in the new reply message may be disabled as well.

In order to further secure the reply message, the client reader 203 may set the same "eyes-only" attributes in the reply message that were set in the original message The eyes-only indicator thus significantly limits the tool that may be used by an intended reader to disseminate an e-mail message when such dissemination is undesired by the sender of the e-mail message. Thus, the principles of the invention reduce the likelihood that a sensitive e-mail message may be leaked to unintended parties.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by united states letters patent is:

1. In an e-mail sender client that is network connectable to an e-mail reader client so as to be capable of sending an e-mail message to the e-mail reader client, a method of transmitting the e-mail message in a way that discourages dissemination of information contained within the e-mail message, the method comprising the following:

an act of accessing an e-mail message;

an act of setting an indicator indicating that one or more functions that limit the opportunity to disseminate e-mail messages are to be applied to the e-mail message;

an act of associating the indicator with the accessed e-mail message;

an act of encrypting the e-mail message; and an act of dispatching the e-mail message to the e-mail reader client in encrypted form through the use of an e-mail server, wherein the e-mail server, prior to transmitting the e-mail message to the e-mail reader client, first determines that the e-mail reader client is capable of implementing the one or more functions, and such that the e-mail message is not transmitted to the e-mail reader client until the e-mail server first determines that the e-mail reader client is capable of implementing the one or more functions.

2. A method in accordance with claim 1, wherein the indicator further identifies the one or more functions that limit the opportunity to disseminate e-mail messages.

3. A method in accordance with claim 1, wherein the act of setting an indicator indicating that one or more functions that limit the opportunity to disseminate e-mail messages are to be applied to the e-mail message comprises the following:

an act of setting an indicator indicating a disablement of printing the e-mail message.

4. A method in accordance with claim 1, wherein the act of setting an indicator indicating that one or more functions that limit the opportunity to disseminate e-mail messages are to be applied to the e-mail message comprises the following:

an act of setting an indicator indicating a disablement of copying the e-mail message.

5. A method in accordance with claim 1, wherein the act of setting an indicator indicating that one or more functions that limit the opportunity to disseminate e-mail messages are to be applied to the e-mail message comprises the following:

an act of setting an indicator indicating a disablement of saving the e-mail message.

6. A method in accordance with claim 1, wherein the act of setting an indicator indicating that one or more functions that limit the opportunity to disseminate e-mail messages are to be applied to the e-mail message comprises the following:

an act of setting an indicator indicating a disablement of forwarding the e-mail message.

7. A method in accordance with claim 1, wherein the act of setting an indicator indicating that one or more functions that limit the opportunity to disseminate e-mail messages are to be applied to the e-mail message comprises the following:

an act of setting an indicator indicating a disablement of print screening the e-mail message.

8. A method in accordance with claim 1, wherein the act of setting an indicator indicating that one or more functions that limit the opportunity to disseminate e-mail messages are to be applied to the e-mail message comprises the following:

an act of setting an indicator indicating that reply functions are to be limited.

9. A method in accordance with claim 1, wherein the act of setting an indicator indicating that one or more functions that limit the opportunity to disseminate e-mail messages are to be applied to the e-mail message comprises the following:

an act of setting an indicator indicating that reply all functions are to be limited.

10. A method in accordance with claim 1, wherein the act of setting an indicator indicating that one or more functions that limit the opportunity to disseminate e-mail messages are to be applied to the e-mail message comprises the following:

an act of setting an indicator indicating that the e-mail message should only be temporarily displayed on a monitor.

11. A method as recited in claim 1, wherein the e-mail reader client indicates to the e-mail server that it is capable of implementing the one or more functions during an initial registration process.

12. A method as recited in claim 1, wherein the e-mail reader client indicates to the e-mail server that it is capable of implementing the one or more functions at any time other than during an initial registration process.

13. A computer program product for use in an e-mail sender client that is network connectable to a e-mail reader client so as to be capable of sending an e-mail message to the e-mail reader client, the computer program product for implementing a method of transmitting the e-mail message in a way that discourages dissemination of information contained within the e-mail message, the computer program product comprising a computer-readable medium having stored thereon computer-executable instructions for performing the following:

an act of causing an e-mail message to be accessed;

an act of causing an indicator to be set, the indicator indicating that one or more functions that limit the opportunity to disseminate e-mail messages are to be applied to the e-mail message;

an act of causing the indicator to be associated with the accessed e-mail message;

an act of encrypting the e-mail message; and an act of causing the e-mail message to be dispatched the e-mail reader client in encrypted form through the use of an e-mail server, wherein the e-mail server, prior to transmitting the e-mail message to the e-mail reader client, first determines that the e-mail reader client is capable of implementing the one or more functions, and such that the e-mail message is not transmitted to the e-mail reader client until the e-mail server first determines that the e-mail reader client is capable of implementing the one or more functions.

14. A computer program product in accordance with claim 13, wherein the computer-readable medium is one or more physical storage media.

15. In an e-mail server that is network connectable to an e-mail sender client and to an e-mail reader client so as to be capable of receiving e-mail messages from the e-mail sender client and communicate e-mail message to the e-mail reader client, a method of discouraging dissemination of information contained within an e-mail message received from the e-mail sender client, the method comprising the following:

an act of receiving an e-mail message in encrypted form;

an act of storing the e-mail message in encrypted form;

an act of determining that the e-mail message has an associated indicator indicating that one or more functions that limit the opportunity to disseminate e-mail messages are to be applied to the e-mail message;

an act of verifying that the e-mail reader client is capable of implementing the one or more functions; and only after verifying, that the e-mail reader client is capable of implementing the one or more functions, an act of transmitting the e-mail message to the e-mail reader client in encrypted form, such that the e-mail message is not transmitted to the e-mail reader client until the e-mail server first determines that the e-mail reader client is capable of implementing the one or more functions.

16. A method in accordance with claim 15, further comprising:

an act of authenticating a user of the e-mail reader client as being an intended recipient of the e-mail message, wherein the act of transmitting occurs after the act of authenticating.

17. A method in accordance with claim 15, wherein the indicator further identifies the one or more functions that limit the opportunity to disseminate e-mail messages.

18. A method in accordance with claim 15, wherein the act of determining that the e-mail message has an associated indicator indicating that one or more functions that limit the opportunity to disseminate e-mail messages are to be applied to the e-mail message comprises the following:

an act of determining that the e-mail message has an associated indicator indicating the disablement of printing the e-mail message.

19. A method in accordance with claim 15, wherein the act of determining that the e-mail message has an associated indicator indicating that one or more functions that limit the opportunity to disseminate e-mail messages are to be applied to the e-mail message comprises the following:

an act of determining that the e-mail message has an associated indicator indicating the disablement of copying the e-mail message.

20. A method in accordance with claim 19, wherein the act of determining that the e-mail message has an associated indicator indicating the disablement of copying the e-mail message comprises the following:

an act of determining that the e-mail message has an associated indicator indicating the disablement of the cut editing function.

21. A method in accordance with claim 19, wherein the act of determining that the e-mail message has an associated indicator indicating the disablement of copying the e-mail message comprises the following:

an act of determining that the e-mail message has an associated indicator indicating the disablement of the copy editing function.

22. A method in accordance with claim 15, wherein the act of determining that the e-mail message has an associated indicator indicating that one or more functions that limit the opportunity to disseminate e-mail messages are to be applied to the e-mail message comprises the following:

an act of determining that the e-mail message has an associated indicator indicating the disablement of saving the e-mail message.

23. A method in accordance with claim 15, wherein the act of determining that the e-mail message has an associated indicator indicating that one or more functions that limit the opportunity to disseminate e-mail messages are to be applied to the e-mail message comprises the following:

an act of determining that the e-mail message has an associated indicator indicating the disablement of forwarding the e-mail message.

24. A method in accordance with claim 15, wherein the act of determining that the e-mail message has an associated indicator indicating that one or more functions that limit the opportunity to disseminate e-mail messages are to be applied to the e-mail message comprises the following:

an act of determining that the e-mail message has an associated indicator indicating that reply functions are to be limited.

25. A method in accordance with claim 15, wherein the act of determining that the e-mail message has an associated indicator indicating that one or more functions that limit the opportunity to disseminate e-mail messages are to be applied to the e-mail message comprises the following:

an act of determining that the e-mail message has an associated indicator indicating that reply all functions are to be limited.

26. A method in accordance with claim 15, wherein the act of determining that the e-mail message has an associated indicator indicating that one or more functions that limit the opportunity to disseminate e-mail messages are to be applied to the e-mail message comprises the following:

an act of determining that the e-mail message has an associated indicator indicating the disablement of print screening the e-mail message.

27. A method in accordance with claim 15, wherein the act of determining that the e-mail message has an associated indicator indicating that one or more functions that limit the opportunity to disseminate e-mail messages are to be applied to the e-mail message comprises the following:

an act of determining that the e-mail message should only be temporarily displayed on a monitor.

28. A computer program product for use in an e-mail server that is network connectable to an e-mail sender client and to an e-mail reader client so as to be capable of receiving e-mail messages from the e-mail sender client and communicate e-mail message to the e-mail reader client, the computer program product for implementing a method of discouraging dissemination of information contained within an e-mail message received from the e-mail sender client, the computer program product comprising a computer-readable medium having stored thereon computer-executable instructions for performing the following:

an act of detecting the receipt of an e-mail message in encrypted form;

an act of causing the e-mail message to be stored in encrypted form;

an act of determining that the e-mail message has an associated indicator indicating that one or more functions that limit the opportunity to disseminate e-mail messages are to be applied to the e-mail message;

an act of verifying that the e-mail reader client is capable of implementing the one or more functions; and only after verifying that the e-mail reader client is capable of implementing the one or more functions, an act of transmitting the e-mail message to the e-mail reader client in encrypted form, such that the e-mail message is not transmitted to the e-mail reader client until the e-mail server first determines that the e-mail reader client is capable of implementing the one or more functions.

29. A computer program product in accordance with claim 28, wherein the computer-readable medium is one or more physical storage media.

30. In an e-mail reader client that is network connectable to an e-mail sender client so as to be capable of receiving an e-mail message from e-mail sender client, a method of discouraging dissemination of information contained within the e-mail message, the method comprising the following:

an act of receiving an e-mail message in encrypted form from an e-mail server wherein the e-mail message is only transmitted to the e-mail reader client from the e-mail server after the e-mail server has first determined that the e-mail reader client is capable of implementing one or more functions that have been applied to the e-mail message by the e-mail sender that limit the opportunity to disseminate the e-mail message, and such that the e-mail reader will only receive the e-mail message from the e-mail server after the e-mail server has verified that the e-mail reader is capable of implementing the one more functions;

an act of storing the e-mail message in encrypted form;

an act of determining that the e-mail message has an associated indicator indicating that the one or more functions that limit the opportunity to disseminate e-mail messages are to be applied to the e-mail message; and an act of implementing the one or more functions on the e-mail message.

31. The method in accordance with claim 30, further comprising the following:

an act of identifying the one or more functions from the indicator.

32. The method in accordance with claim 30, wherein the one or more functions are default functions to be performed upon completion of the act of determining.

33. The method in accordance with claim 30, wherein the act of implementing the one or more functions on the e-mail message comprises the following:

an act of disabling printing of the e-mail message.

34. The method in accordance with claim 30, wherein the act of implementing the one or more functions on the e-mail message comprises the following:

an act of disabling copying of the e-mail message.

35. The method in accordance with claim 30, wherein the act of implementing the one or more functions on the e-mail message comprises the following:

an act of disabling saving of the e-mail message.

36. The method in accordance with claim 30, wherein the act of implementing the one or more functions on the e-mail message comprises the following:

an act of disabling forwarding of the e-mail message.

37. The method in accordance with claim 30, wherein the act of determining comprises an act of determining that reply functions are to be limited, wherein the act of implementing the one or more functions on the e-mail message comprises the following:

an act of receiving a user input selection of a reply button;

generating a reply message template in response to the user input selection;

an act of disabling the editing of the addressing fields corresponding to the reply message template.

38. The method in accordance with claim 37, wherein the act of disabling the editing of the reply message template comprises the following:

an act of disabling the editing of the "TO" address field;

an act of disabling the editing of the "CC" address field; and an act of disabling the editing of the "BCC" address field.

39. The method in accordance with claim 30, wherein the act of determining comprises an act of determining that reply all functions are to be limited, wherein the act of implementing the one or more functions on the e-mail message comprises the following:

an act of receiving a user input selection of a reply all button;

an act of generating a reply message template in response to the user input selection;

an act of disabling the editing of the addressing fields corresponding to the reply message template.

40. The method in accordance with claim 39, wherein the act of disabling the editing of the reply message template comprises the following:

an act of disabling the editing of the "TO" address field;

an act of disabling the editing of the "CC" address field; and an act of disabling the editing of the "BCC" address field.

41. The method in accordance with claim 30, wherein the act of implementing the one or more functions on the e-mail message comprises the following:

an act of disabling print screening of the e-mail message.

42. The method in accordance with claim 30, wherein the act of implementing the one or more functions on the e-mail message comprises the following:

an act of displaying the e-mail message for a predetermined amount of time; and an act of disabling the display of the e-mail message after the act of displaying.

43. A computer program product for use in an e-mail reader client that is network connectable to an e-mail sender client so as to be capable of receiving an e-mail message from e-mail sender client, the computer program product for implementing a method of discouraging dissemination of information contained within the e-mail message, the method comprising the following:

an act of detecting the receipt of an e-mail message in encrypted form from an e-mail server, wherein the e-mail message is only transmitted to the e-mail reader client from the e-mail server after the e-mail server has first determined that the e-mail reader client is capable of implementing one or more functions that have been applied to the e-mail message by the e-mail sender that limit the opportunity to disseminate the e-mail message, and such that the e-mail reader will only receive the e-mail message from the e-mail server after the e-mail server has verified that the e-mail reader client is capable of implementing the one or more functions;

an act of causing the e-mail message to be stored in encrypted form;

an act of determining that the e-mail message has an associated indicator indicating that the one or more functions that limit the opportunity to disseminate e-mail messages are to be applied to the e-mail message; and an act of causing the one or more functions to be applied to the e-mail message.

44. A computer program product in accordance with claim 43, wherein the computer-readable medium is one or more physical storage media.

\* \* \* \* \*